UNITED STATES PATENT OFFICE 2,489,970

BROMINE TRIFLUORIDE TREATMENT OF UNSATURATED ORGANIC COMPOUNDS

Earl T. McBee, La Fayette, Ind., Vincent V. Lindgren, Cos Cob, Conn., and Waldo B. Ligett, Berkley, Mich., assignors to Purdue Research Foundation, La Fayette, Ind., a corporation of Indiana No Drawing. Application March 12, 1947, Serial No. 734,228

4 Claims. (Cl. 260—648)

This invention relates to a process for the preparation of fluorine-containing aliphatic and alicyclic halocarbons and halohydrocarbons, and is more particularly concerned with a method for the treatment of unsaturated organic compounds with bromine trifluoride.

The fluorinating agent of our invention, i. e., bromine trifluoride, has long been available to any investigator of fluorine chemistry, and may be prepared by passing elemental fluorine into bromine in a copper vessel or other container resistant to the action of the said reactants at a temperature of about ten degrees centigrade until no further quantity of fluorine is absorbed. No limiting difficulties are encountered in its preparation.

An undesirable and definitely limiting characteristic of this fuming liquid, however, is its excessive reactivity with most organic matter. The fact that this liquid reacts vigorously, when in contact with most organic material, has proven a tremendous obstacle to investigators of the field. Owing to the violent nature of most reactions between bromine trifluoride and organic matter, few successful experiments have been reported. Nutting (U. S. Patent 1,961,622, June 5, 1934) succeeded in reacting bromine trifluoride and carbon tetrachloride to produce fluorinated methanes, but the art regarding reactions of bromine trifluoride and unsaturated compounds has been conspicuously barren.

Our invention is thus concerned with a new and useful improvement whereby unsaturated compounds, including unsaturated cyclic organic compounds and hydrogen-containing unsaturated cyclic organic compounds, may be treated with bromine trifluoride as an active fluorinating agent, and whereby we may produce various fluorine-containing compounds, in each case containing more fluorine than the starting unsaturated compound. Our invention is further concerned with the reaction of bromine trifluoride and unsaturated halocarbons and halohydrocarbons to produce fluorine-containing halocarbons and halohydrocarbons. A preferred embodiment of our invention resides in the reaction of bromine trifluoride and an unsaturated acyclic or cyclic organic compound to produce high molecular weight fluorine-containing saturated halohydrocarbons and halocarbons, containing the same number of carbon atoms as the unsaturated compound reacted in the process. The provision of a method whereby the above improvements may be accomplished is included among the objects of our invention.

We have also found that bromine trifluoride has utility in the following ways, all heretofore unreported:

1. Bromine trifluoride adds fluorine to points of unsaturation in an unsaturated organic compound. Some bromine may also enter the molecule, for example, by addition to a carbon-carbon double bond, but the possible addition of bromine is not to be considered an undesirable effect of the bromine trifluoride fluorination process. Thus, we have found any bromine which is introduced to be replaceable, with fluorine, by reaction with antimony pentafluoride, if such is desired.

2. Bromine trifluoride may be used to replace, with fluorine, other halogen atoms in an unsaturated organic compound. In this respect, we have found the presence of hydrogen in the unsaturated organic molecule to have no prohibitive effect on the replacement, with fluorine, of other halogen atoms in the molecule.

The provision of a process whereby 1 and 2 above may be accomplished is included as a further object of our invention.

Also included among the objects of our invention is the provision of a process whereby unsaturated carbon-carbon bonds of an organic compound may be saturated, with fluorine, by reaction with bromine trifluoride, to produce a saturated fluorine-containing organic compound.

In some cases, new and useful halocarbons and halohydrocarbons are procured directly from the process. In other instances, the dehalogenation of fluorine-containing alicyclic halocarbons and halohydrocarbons prepared by the bromine trifluoride treatment of unsaturated cyclic compounds may yield desirable aromatic or otherwise unsaturated cyclic fluorocarbons and fluorine-containing halocarbons. These compounds exhibit particular utility as dielectrics, heat transfer media, specific solvents, transformer fluids, insulating liquids, and the like. Some of these compounds are also useful in the preparation of fluorine-containing synthetic resins. It is therefore an additional object of this invention to provide a method for the production of new compounds, including chemical intermediates for the preparation of useful aromatic or unsaturated cyclic fluorocarbons and fluorine-containing halocarbons. Other objects of our invention will become apparent hereinafter.

The present invention essentially comprises the treatment of an unsaturated organic compound with bromine trifluoride at a temperature between about zero degrees and about 175 degrees centigrade, preferably within the lower temperature ranges. The reaction is advantageously carried out by admixing the reactants at a relatively low temperature, e. g., between zero and sixity degrees centigrade, and thereafter heating the reaction mixture at a relatively higher temperature, e. g., sixty to 200 degrees centigrade. The pressure under which the reaction is carried out may be subatmospheric, atmospheric, or superatmospheric.

While the present invention, in its broader sense, is applicable in the fluorination of any unsaturated organic compound, including unsaturated acids, ketones, aldehydes, ethers, hydrocarbons, halohydrocarbons, or halocarbons, whether the compound be acyclic or cyclic, and regardless of the degree of unsaturation of the compound treated, certain differences between types of compounds lend additional advantages to the process as applied to unsaturated halocarbons, i. e., compounds containing only halogen and carbon, and to unsaturated halohydrocarbons. A preferred method of operation under the invention therefore involves its application to these types of compounds, and especially to an unsaturated hydrocarbon having at least about one-fourth of its original hydrogen atoms replaced by halogen atoms. These halogen atoms may be either bromine, chlorine, fluorine, or iodine, or combinations of several or all members of the class. The process is even more advantageously applicable to a hydrocarbon having one-half or more of its original hydrogen atoms replaced by halogen atoms. Such a compound usually allows a more easily controllable reaction, and the obviation of excessively tedious reaction procedure adds much to the preferred embodiment of the reaction over the same process when employed with compounds having a lesser or no halogen content.

In the practice of our invention, the unsaturated organic compound and bromine trifluoride may be contacted in any suitable manner. Thus, we may place the unsaturated organic compound in a suitable reaction container and add the bromine trifluoride thereto. It is sometimes more advantageous to apply the reverse procedure, adding the unsaturated organic compound to bromine trifluoride. Occasionally, it is of assistance to employ a liquid medium for the reaction, e. g., liquid bromine, although the unsaturated organic compound or mixture of compounds and bromine trifluoride may be reacted directly.

After the reactants have been contacted, at all times with suitable precautions as outlined below, the mixture is heated to a satisfactory temperature, e. g., room temperature to 175 degrees centigrade, and maintained at this temperature for a considerable interval, for example, three to thirty-six hours. Any excess bromine trifluoride may then be destroyed by the addition of a suitable agent, e. g., cracked ice, cold water, sodium bicarbonate, et cetera, and the resulting halocarbon, halohydrocarbon, or mixture of both, may be washed with aqueous alkali, dissolved in a suitable solvent, dried, and the product recovered. If a further reaction is not desired, the organic product from the bromine trifluoride reaction may be treated for purification and extraction purposes as above, or in any other manner apparent to one skilled in the art.

Although the above conditions represent the optimum for the new process, temperature ranges of considerably wider scope have been employed with success, e. g., the reaction proceeds satisfactorily between zero and 200 degrees centigrade, preferably between zero and 175 degrees centigrade, with somewhat more decomposition occurring at the upper temperature levels.

A primary consideration in carrying out our process, regardless of the method by which reactants are contacted, is the prevention of accumulation of unreacted starting materials. For this reason we employ constant agitation of the reaction mixture and introduce the particular reactant which is selected for addition in a portionwise manner, especially during the early stages of the reaction. For this reason, also, we find that cooling of the reaction to low temperatures, e. g., zero degrees centigrade, and subsequent heating of the reaction at a higher temperature, for example, 100 degrees centigrade, before and after each addition, respectively, is sometimes of particular advantage in causing the reactant in each addition, especially the first additions, to react completely with the other reactants, thus circumventing undesirable accumulation with its contingent pyrolysis or explosion. After the reaction has proceeded for some time, it is usually permissible to increase the rate of addition of reactants because of the diluent effect of the bromine and the already fluorinated product. The reaction may also sometimes be advantageously carried out in the presence of one or more of the products of the reaction, which in such instance serve as a diluent. However, in no case was omission of the above precautions found advisable, either for the procurement of satisfactory products or maximum safety of the operator.

The reaction vessel may be a nickel tube of considerable diameter and appreciable length, for example, 5.2 and 50 centimeters, respectively, sealed at one end. Such a tube, or one of similar construction, proved satisfactory in many of the illustrative examples herein. The means of agitation was, in most cases, a propeller stirrer comprising a motor-driven nickel rod with four nickel blades appended thereto, which was inserted through the top of the tube. It was also found advantageous not to seal the tube at the top, in the event unexpected violence manifested itself during the reaction.

The following example is given to illustrate the practice of our invention, but is in no way to be construed as limiting.

Decachlorobiphenyl was reacted with bromine trifluoride in a nickel tube. Decachlorobiphenyl reacted vigorously than hexachlorobenzene, thereby permitting more rapid addition to the bromine trifluoride. When 200 grams of decachlorobiphenyl has been added at ice temperature, the mixture was too viscous to permit stirring. The remaining organic material was therefore added at or above 50 degrees centigrade with vigorous stirring. The final mixture, comprising a ratio of six moles of bromine trifluoride to one mole of decachlorobiphenyl, was heated overnight at 160 degrees centigrade. The organic product, when pulverized in air, was a dirty-white solid weighing 594 grams. After washing and drying as previously described for hexachlorobenzene, a sample was recrystallized from alcohol, and contained, by analysis, 34.8 per cent fluorine, 35.7 per cent chlorine, and 11.7 per cent bromine. This corresponds approximately to the compound $C_{12}BrCl_8F_{13}$, which contains 32.8 per cent fluorine, 37.6 per cent chlorine, and 10.6 per cent bromine, indicating that the product isolated was a mixture of that average composition.

It is to be understood that the treatment of unsaturated compounds with bromine trifluoride may be allowed to proceed to any desired extent. In many cases in a reaction of bromine trifluoride and an unsaturated compound, addition of fluorine, and possibly some bromine, to the points of unsaturation is the first step to occur, with substitution being effected secondarily. In such cases, a saturated fluorine-containing halohydrocarbon is the first product of an unsaturated hydrocarbon or halohydrocarbon-bromine trifluoride reaction. The saturated fluorine-containing halohydrocarbon, after separation, may then be further reacted with bromine trifluoride to produce a compound of still greater fluorine content.

The ratio of fluorine to other halogen in the product will, of course, be found to vary with the type of starting material and the halogen content of the unsaturated organic compound reacted in the process. For example, the product of a bromine trifluoride treatment of an unsaturated halohydrocarbon may contain fluorine and chlorine, and possibly some bromine. Thus, according to the nature of the reactant, and depending upon the time and temperature employed, the amount of fluorine introduced into any particular molecule may be varied considerably.

Modifications may be made in carrying out the invention and it is to be understood that we limit ourselves only as defined in the appended claims.

We claim:

1. The process for the simultaneous introduction of fluorine and bromine into a polycyclic non-fused-ring halocarbon, which includes the steps of mixing bromine trifluoride with the polycyclic non-fused-ring halocarbon; maintaining the reaction mixture at a temperature between about zero degrees and about 200 degrees centigrade; and separating a more highly saturated fluorine- and bromine-containing halocarbon, containing more fluorine and bromine than the starting halocarbon and containing the same number of carbon atoms as the starting halocarbon, from the resulting reaction product.

2. The process of claim 1, wherein the polycyclic non-fused-ring halocarbon is decachlorobiphenyl.

3. The process according to claim 1, wherein the reaction temperature is maintained below about 175 degrees centigrade.

4. The process according to claim 1, wherein the reactants are admixed at a temperature below about room temperature and are thereafter heated in admixture to a temperature between about room temperature and about 175 degrees centigrade.

EARL T. McBEE.
VINCENT V. LINDGREN.
WALDO B. LIGETT.

REFERENCES CITED

The following references are of record in the file of this patent:

UNITED STATES PATENTS

| Number | Name | Date |
|---|---|---|
| 1,961,622 | Nutting et al. | June 5, 1934 |
| 2,013,035 | Daudt et al. | Sept. 3, 1935 |

OTHER REFERENCES

Miller, J. A. C. S. 62, 341–344 (1940).
Lebeau, Ann. Chim. Phys. 9, 241–261 (1906).